United States Patent [19]
Fier

[11] 3,902,734
[45] Sept. 2, 1975

[54] FRAMES FOR AXLE SUSPENSION SYSTEMS

[75] Inventor: Raymond L. Fier, Massillon, Ohio

[73] Assignee: TWM Manufacturing Company, Inc., Canton, Ohio

[22] Filed: Mar. 14, 1974

[21] Appl. No.: 451,319

[52] U.S. Cl.......... 280/106 R; 267/56; 280/104.5 R
[51] Int. Cl.²......................................... B62D 21/00
[58] Field of Search ......... 280/106, 124 F, 104.5 R, 280/104.5 A, 104.5 B, 81; 267/54 R, 54 A, 56

[56] References Cited
UNITED STATES PATENTS
| | | | |
|---|---|---|---|
| 3,120,395 | 2/1964 | Fite | 280/104.5 R |
| 3,175,819 | 3/1965 | Moreno | 267/56 |
| 3,279,815 | 10/1966 | Hutchens | 280/104.5 R |

*Primary Examiner*—Philip Goodman
*Attorney, Agent, or Firm*—Hall and Myers

[57] ABSTRACT

A frame for an axle suspension system, particularly of the air bag, upwardly biased spring, lift type, which includes: downwardly extending and opposing hanger brackets comprised of a longitudinally extending side wall member and a lateral wall member; and plate means comprising a plurality of laterally extending sections including a first section connected to the lateral wall members of opposing brackets, a second section for contacting a frame member of the vehicle, and a third section extending between the first and second sections at a finite angle to the vertical when the suspension is installed on the vehicle.

13 Claims, 5 Drawing Figures

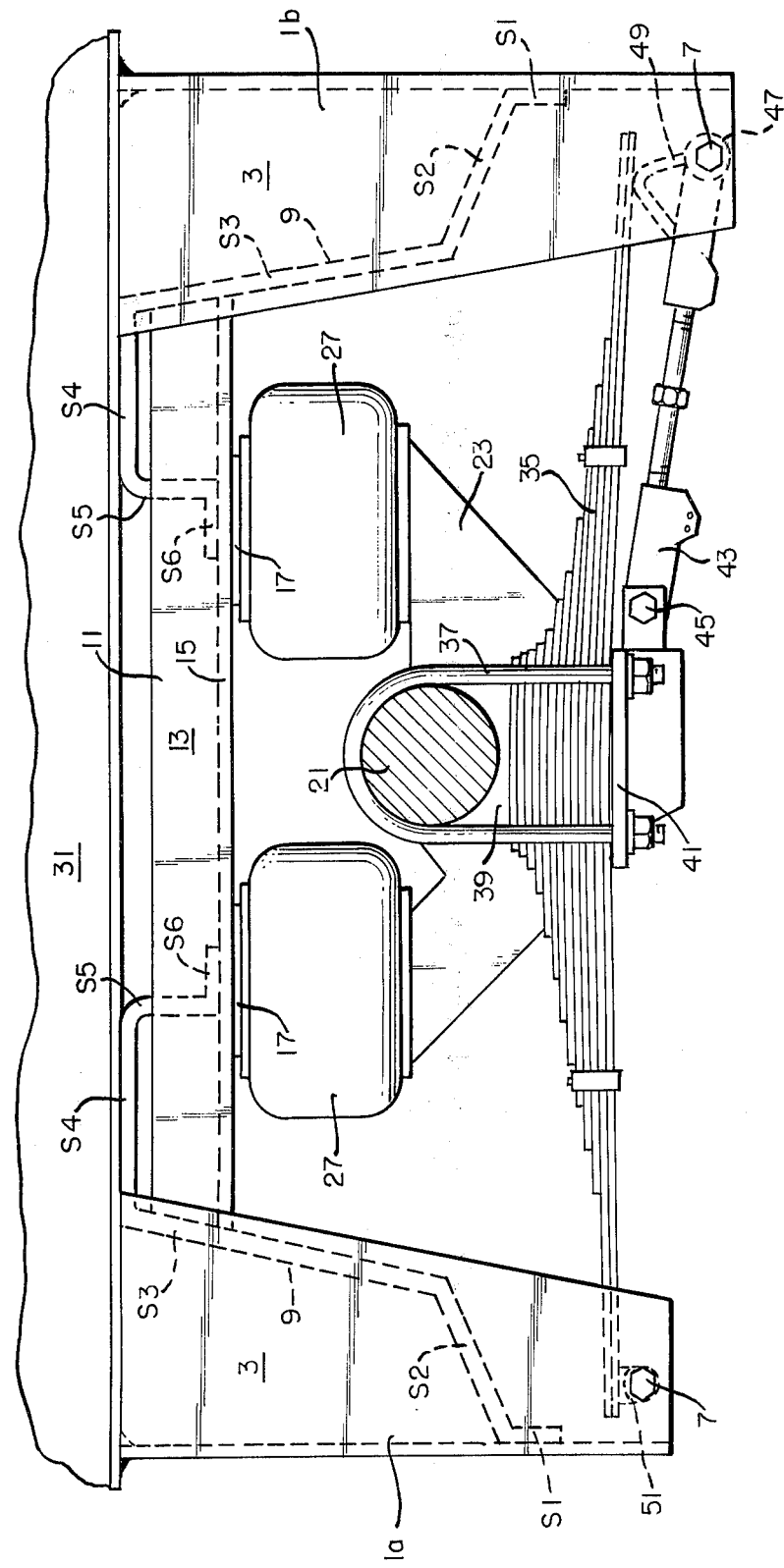

FRAMES FOR AXLE SUSPENSION SYSTEMS

This application relates to unique frame structures for attaching axle suspension systems to the frame members of a vehicle. More particularly, this application relates to a frame structure upon which is mounted an axle suspension system and which is ultimately connected to the frame members of a vehicle, such as a truck or trailer.

With the growing need to transport goods by truck or trailer, has come the everincreasing need for stronger and more reliable axle suspension systems which are capable of taking the jarring forces experienced when the truck or trailer is driven over the road, particularly in loaded condition. It is known that to render many axle suspension systems safe and strong, some specific mechanism is needed to take up the braking and lateral forces (i.e., the braking and dynamic operating forces) which arise during operation of the vehicle. This has usually resulted in employing as part of the suspension, some sort of "trailing arm" attached between the axle and a hanger bracket extending downwardly from the frame member of the vehicle. When so connected, the "trailing arm" transmits the lateral and braking forces to the hanger bracket which in turn transmits these forces to the frame members of the vehicle, i.e., the structures designed to best absorb these forces.

"Trailing arms" may take many forms. In some suspension systems they are radius rods, otherwise known as torque-arms. In other instances, they may be trailing arm beams or leaf springs mounted in the hanger brackets at their ends in such a way as to act as a trailing arm. Regardless of the type of trailing arm employed, it is necessary that the hanger bracket which connects them to the frame member of the vehicle be as strong as possible particularly at its point of attachment to the frame member of the vehicle.

There are further instances where a trailing arm is not employed but where hanger brackets are still used, such as to slidably retain the ends of leaf springs. In such instances, as well, the bracket must be strong and reliably connected to its vehicle frame member.

Since most trucks or trailors are laterally symmetrical, i.e., having two longitudinally extending beams on either side of the vehicle to which the frame structure of the suspension is attached, then this usually necessitates at least two hanger brackets since two trailing arms will be employed, one on either side of the vehicle. It has been known to employ a reinforcing plate between the two opposing hanger brackets (one bracket on either side of the vehicle) to absorb lateral loads and prevent bending of the suspension system. This further strengthens the suspension.

Unfortunately, such laterally extending reinforcing plates or cross-members are difficult to attach to the hanger brackets and when attached have tended to buckel or bend in operation. This is because in order to make these plate members feasible, they must be relatively thin and in most instances must be connected by welding or gusseting the plates to the opposing hangers. Gussets, as is well known, present a difficulty to the art because they violate the flange integrity of the hanger bracket and can come loose during operation of the suspension. In addition, welding has been found to be unsatisfactory because of its lack of strength and tendency to tear during operation. The thinness of the plates, necessary to keep the weight down, presents a weakness problem.

Exemplary of attempts made to employ these plate members are U.S. Pat. Nos. 3,022,087 and 3,279,815. In addition to these two examples, other plates have been developed using relatively complex gusseting in an attempt to overcome the connection problem and to deal with the problem of "diaphragming" or buckling which can occur during turning of the vehicle. Generally speaking none of these known cross-member plates can be successfully welded to the brackets with any acceptable degree of strength and reliability. In addition such plates usually consist of a single plate section extending downwaardly in substantially the vertical direction so as to provide a vertical beam between the hanger brackets. They thus are incapable of serving any other substantially useful function than that of a reinforcing cross-member.

The need for a strong and reliable frame structure for mounting an axle suspension system to the frame members of a truck or trailor is keenly felt in the auxiliary suspension system art. And this need is particularly keen in the sub art thereunder wherein air bags are employed as either air springs for the suspension system, or as a part of the lift mechanism in the third axle lift type of suspensions. Examples of the use of air-springs are prolific and need no citation since such suspensions have been in wide use at least since the early 1950's. Examples of the lift type of system which is increasing in prominence, are disclosed in U.S. Pat. Nos. 3,285,621 and 3,617,072. Such systems generally comprise an upwardly biased leaf spring which normally holds the wheels out of engagement with the road surface and an airbag system which when expanded drives the wheels downwardly to engage the road. Since the leaf springs and/or airbags in these devices are preloaded and/or expanded respectively, it is not only necessary that the frame structure be capable of tolerating the usual loads and forces but be capable of absorbing the preload of the leaf springs and force of the expanded airbags as well.

The devices disclosed in the aforementioned third axle lift system U.S. Pat. Nos. 3,285,621 and 3,617,072, have been found to be advantageous and entirely useful for their particular purpose. On the other hand, a significant improvement in the strength of these units is disclosed in U.S. Pat. No. 3,877,718. In this patent, it is disclosed that higher suspension strengths can be obtained by employing a unique air bag system and leaf spring system, wherein, for the first time, either or both of the air bag system and/or leaf spring system is located substantially directly under the frame member. As described in this patent, the disclosure of which is incorporated herein by reference, the air bags are presented in a spread configuration (e.g., substantially directly under the frame member) so as to locate them in their uniquely advantageous strengthening position, while each of the upwardly biased leaf springs are located substantially directly under the frame member. While this system provides an extremely strong unit, maximum strength is achieved by providing not only the leaf springs substantially under the frame member, but the air bag in spread configuration as well.

Unfortunately, many vehicles cannot accommodate the necessary size of air bag system and still maintain the air bags in spread configuration. Rather, on these vehicles the air bags must be laterally displaced inwardly from under the frame member. While the location of the leaf springs substantially directly under the frame member provides an excellent degree of strength and thus strengthens the overall unit, the ultimate strength is not achieved because of this lateral displacement of the air bags inwardly from under the frame member. It would therefore be desirable to include within such a system a mechanism for compensating for the loss of strength experienced by this lateral inward displacement so as to achieve maximum strength.

In addition to the above problems, airbags are subject to rupture, puncture, or other damage due to objects being "kicked up" from the road surface and striking or sticking to the air bags. This problem often necessitates either the early replacement of the air bags, or the dangerous situation where an air bag may rupture during operation. When such an air bag is in its inflated condition, this can cause a serious handling problem before the vehicle upon which the system is employed is brought to a halt.

In addition to the above problems, there has often been experienced the problem of how to attach the frame structure of the suspension to the frame member of the truck. In many instances, the frame structure does not employ a sufficient number of members or a sufficient surface area to successfully attach the suspension to the frame members of the vehicle. This is particularly true in the trailer industry, where the trailers employ relatively small I-beam frame members. In addition, these trailers with their wide spread between I-beam frame members, also usually give rise to the problem described hereinabove, with respect to having to laterally and inwardly displace air bags from under the frame member.

It is therefore apparent from the above, that there exists a need in the art and particularly in the trailer art for a frame structure capable of having mounted thereon an axle suspension system and capable of connecting the suspension system in a strong and reliable way to the frame members of the vehicle.

In addition, there exists a need for this frame structure to be capable of safely taking up at least the major forces upon the axle suspension system which must be transmitted either to this frame structure or ultimately to the frame members of the vehicle during operation of the vehicle. And, in this respect, it would be of significant benefit to employ as a strengthening member in such a structure, a cross member plate means which was easily connected to opposing brackets, which resisted bending and buckling, and which served further useful purposes other than just being a reinforcing member.

In addition, it would be of significant benefit to the air bag axle suspension system art, if there were provided a safety mechanism within the frame structure itself which served to protect the air bags from flying debris, or being caked with ice, mud, slag, dirt and the like.

It would also be of significant benefit to the art, if this frame structure, which when having mounted thereon an expandable air bag, upwardly biased lift spring suspension, could employ at least some of the strengthening features of the aforementioned U.S. Pat. No. 3,877,718 and yet could compensate for at least a portion of the loss of strength by having to displace the air bags inwardly from under the frame member of the vehicle.

It is a purpose of this invention to fulfill the above described needs and provide the above described benefits. These and other needs fulfilled and benefits received by practicing this invention will become more apparent to the skilled artisan once given the following detailed description, wherein:

IN THE DRAWINGS

FIG. 4 is a side sectional view of a frame structure in accordance with this invention having mounted thereon an auxiliary axle suspension system and connected to the frame member of a vehicle;

Figure 1:
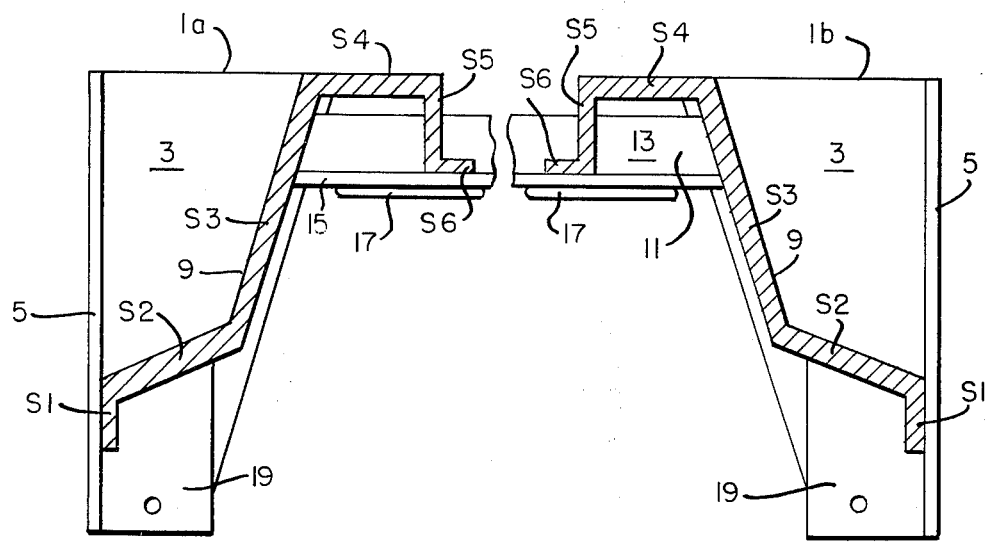
FIG. 1 is a side sectional view of a frame structure in accordance with this invention.
Figure 2:
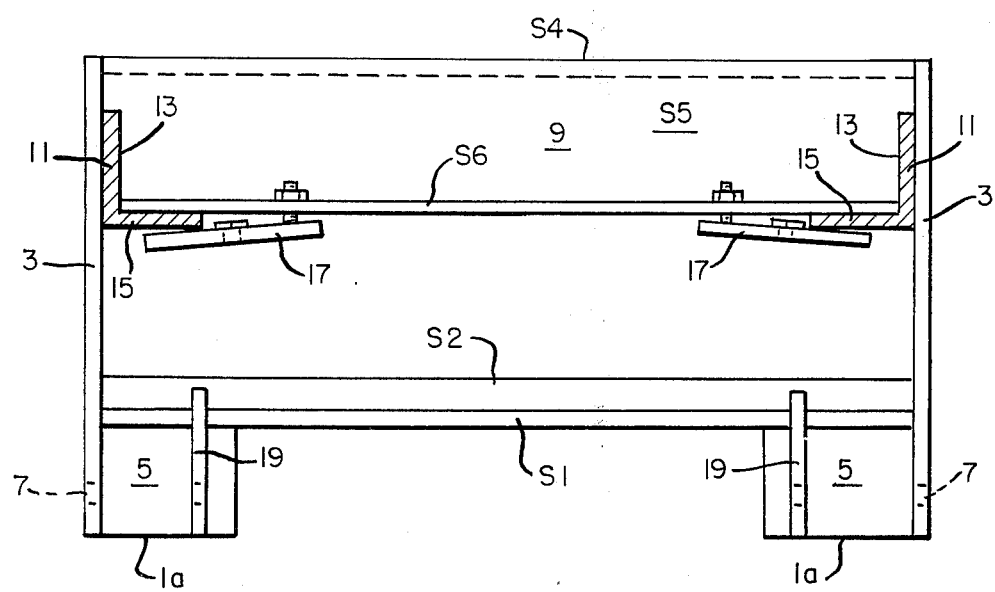
FIG. 2 is an end sectional view of the embodiment of FIG. 1.
Figure 3:
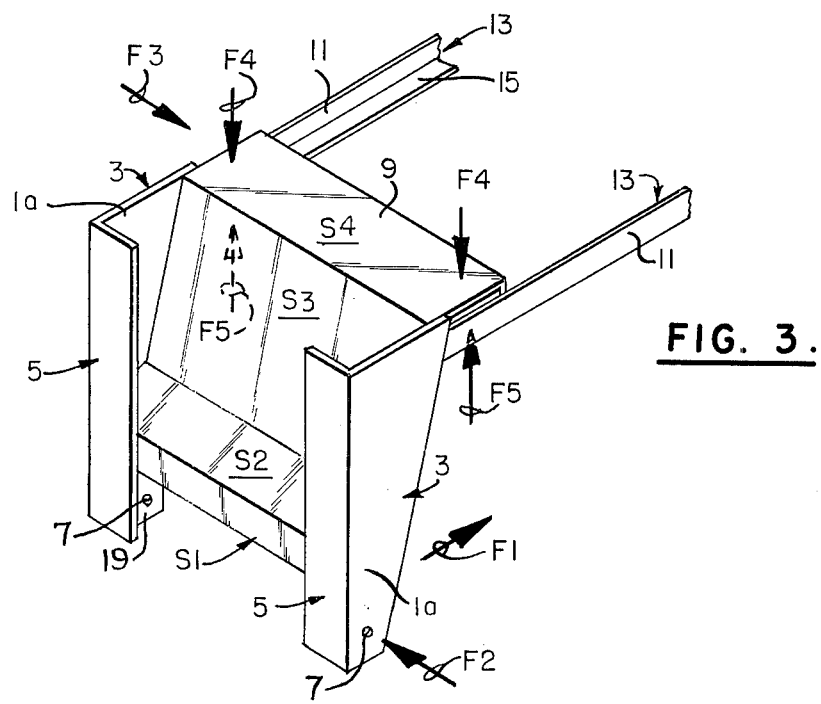
FIG. 3 is a partial, perspective view of an embodiment of a frame structure in accordance with this invention.

Referring to FIGS. 1–3, there is illustrated a frame structure, which in accordance with this invention, will fulfill the above-described needs in the art. This frame structure is comprised of complementary hanger brackets 1a–b. In the usual situation, the vehicle to which this frame structure is to be attached has two longitudinally extending frame members on either side of the vehicle. The frame structure is usually attached to those frame members and thus, as illustrated in FIGS. 2–3, there are provided two opposing hanger brackets 1a and two opposing hanger brackets 1b.

Each of these hanger brackets, as shown in perspective in FIG. 3, is comprised of a longitudinally extending side wall 3 and a laterally extending wall 5. In addition, the lower portions of longitudinal side walls 3 are provided with a means 7 such as a drilled hole or the like, for mounting a pin therein upon which the trailing arm (i.e., the means for taking up the braking and lateral forces) may be mounted.

Extending laterally between opposing hanger brackets 1a or 1b is a unique reinforcing, multisectional, plate means 9. Plate means 9 is comprised of a first section $S_1$ which extends laterally between opposing hanger brackets and is connected by any convenient means and preferably by welding, to the inner surface of lateral wall 5 of hanger brackets 1. While plate means 9 may be formed of separate and distinct sections, it is preferred for the purposes of this invention that plate means 9 be a continuous unitary plate. Thus as illustrated in the drawings, extending from the upper portion of section $S_1$ and as a continuum thereof is section $S_2$. Section $S_2$ slopes rearwardly and upwardly from section $S_1$ and extends laterally between opposing hanger brackets 1a. The ends of section $S_2$ may be connected to longitudinal side walls 3 of opposing hanger brackets by welding thereto.

Extending upwardly and sloping rearwardly (again as a continuum) for the rearwardmost end of section $S_2$ is a third section $S_3$ which in a like manner to $S_2$ extends laterally between opposing hanger brackets 1 and may be connected at its ends, as by welding, to the inner surface of longitudinal side walls 3 of opposing hanger brackets. $S_3$ is of a sufficient length so as to terminate in an upper surface defining the next or fourth section $S_4$ whose upper surface is in substantially the same horizontal plane as the upper surface of its respective opposing hanger brackets 1a or 1b. In this sense, then, $S_4$ extends in a continuum from $S_3$ rearwardly in a substantially horizontal direction and ultimately terminates, again in a continuum, with fifth section $S_5$ of a generally vertical and downwardly extending nature. As can be seen, $S_4$ extends laterally between opposing hanger brackets and generally overlaps longitudinal beams 11. Section $S_4$ may be weldingly connected at its forwardmost end to the inner surface of its respective longitudinal contacting side wall 3 of hanger brackets 1.

Longitudinally extending beam 11 is formed of a longitudinal side flange 13 and a laterally extending lower flange 15 substantially perpendicular to flange 13. Section $S_5$ extends laterally between and may slightly overlap with opposing beams 11 and may be connected at its overlap to the upper edge of flange 13 and at its connecting edge to the inner surface of flange 13.

Section $S_5$ terminates in continuum with substantially horizontal flange section $S_6$ which extends laterally between opposing beams 11 and may be connected to either or both of flanges 15 and 13 by welding. In those instances in which there is needed a strong support for a component of the axle suspension system to be mounted on the frame structure, such as where an air bag system is to be employed, flange section S6 may be employed for this purpose. This is illustrated best in FIG. 2 wherein air bag plate 17 are secured to $S_6$ at one end and may be secured to lower lateral flange 15 of beam 11 as well.

In order to form a complete retaining mechanism for the trailing arm (i.e., springs, radius rods, etc.) there is further provided in the lower portion of hanger brackets 1, a longitudinally, downwardly extending plate member 19 having a complimentary hole 7 to that in wall 3 of opposing brackets and running substantially parallel to wall 3. As can be seen, by providing connected walls 3 and 5, sections $S_1$ and $S_2$ and plate members 19 there is formed a "box" for housing the connecting mechanism of the trailing arm and/or other device.

FIGS. 1–2 illustrate a symmetrical frame member wherein there is provided, on either side of both the lateral and longitudinal lines of symmetry, a like structure. While in many instances, such as with the use of the axle suspension systems illustrated in FIGS. 4 and 5, this is either necessary or desirable, in many instances it may not be. In other words, it may only be necessary to employ either the right hand half or the left hand half of the structure illustrated FIG. 1 such as is illustrated in FIG. 3 because of the nature of the suspension employed. And in this sense, it may not be necessary to employ beams 11 but rather to omit them, thus leaving only two opposing hanger brackets 1a or 1b and plate member 9 to form the frame structure. Exemplary of such a system would be where half elliptic leaf springs were not employed in the suspension, such that only the radius rod need be provided for in one set of opposing hanger brackets. As can be seen, the exact choice of how much of the structure to employ will of course depend upon the particular type of suspension mounted on the frame. Generally speaking, however, it is necessary to employ at least two opposing hanger brackets having extending laterally there between the plate member 9 which employs at least a first section $S_1$, a second section $S_4$ and at least one section $S_2$ or $S_3$ extending between sections $S_4$ and $S_1$.

FIG. 3 may be employed to illustrate a typical force diagram (as per the heavy-lined arrows) of some of the primary forces which are experienced during operation of an axle suspension system when installed on a wheeled vehicle. In this respect, it can be seen that during operation horizontal force or load $F_1$ will result from braking, hitting bumps and holes, as introduced by the leaf springs and radius rods or other trailing arms. In addition, there will exist a lateral force or load $F_2$ during turning of the vehicle. There will further be introduced during turning, a horizontal force or load $F_3$ which is introduced by the vehicle frame. Force or load $F_4$ is the vertical load resulting from the forces and weight of the vehicle while force or load $F_5$ is the vertical load introduced into section $S_6$ and flange 15 if air bags are employed either as an air spring or in the lift system hereinabove described.

As can be seen all of these forces are adequately and reliably taken up by the unique frame structure of this invention.

FIGS. 1–3 show that there is provided a unique frame structure applicable to a wide variety of axle suspension systems and capable of being attached easily, efficiently and with high strength to the frame members of a vehicle. In addition, there is proveded a safety mechanism for deflecting debris and preventing the collection of dirt, slag or the like on air bags if employed, by the unique structure. For example, multisection continuum plate 9, because of its multisections, and angles therebetween, provide an exceedingly strong reinforcing cross member despite the fact that plate 9 is only made of relatively thin piece of metal. By providing at least sections $S_1$, $S_2$ and $S_3$ (and at times a portion of $S_4$) in their configured position, so as to provide a continuously bent shape, the panel areas are reduced thus allowing for increased loads to be sustained, which loads might normally buckle a single section panel. In addition, because of the bent multiple section shape of this panel, there is provided excellent weld geommetry so that the ultimate welds along the ends of the plate connecting the plate to opposing Hanger brackets 1 and beam 11 are exceedingly strong and allow the welds to share more of the load forces without tearing.

In addition, by providing the upper surface of section $S_4$ in substantially the same horizontal plane as the upper surface of walls 3 and 5, there is provided a beam $S_4$ for attaching to the longitudinal frame members of a vehicle. Further, the upper surfaces of walls 3 and 5 provide a "L" shape for attaching to the frame member of a vehicle, thus providing more weld surfaces and directions and thus higher strength. This higher strength acts effectively against destructive forces $F_1$ and $F_2$ without the need for complex gussets and the like. Still further, flanged beam 11 provides a mechanism for taking up the preload force of the air springs or other forces of load forces suspension and also provides a strengthening and retaining means for section $S_6$.

By providing plate 9 in the position in which it is presented, the axle suspension system is effectively boxed in thus not only providing increased strength but providing a shield mechanism for protecting air bags or other components of the suspension system from flying debris. In addition, by providing section $S_2$ in addition to $S_3$, and by sloping it upwardly from $S_1$ to $S_3$, there is provided a mechanism for effectively sheding ice, water, mud and dirt which might otherwise accumulate in a perpendicular flange during operation.

In addition to the above advantages, by providing sections $S_5$ and $S_6$, there is effectively provided a strong beam for carrying the air bag (when bags are employed in the suspension) load $F_5$ out to the vehicle frame, thus to transmit the load into the frame members of the vehicle which are designed to take up such a load. In addition, plate 9 effectively provides a shear panel for transmitting the lateral loads $F_2$ and $F_3$ to the vehicle structure. By boxing in hanger plate 1, furthermore, the hanger plates are stiffened and thus buckling from forces $F_1$ and $F_2$ are effectively prevented. And, as mentioned above in regards to sections $S_1 - S_4$ by providing the particular weld geometry of sections $S_4 - S_6$, there is provided an easy mechanism for connecting the rearward "beam end" of plate 9 to beam 11. Thus with the overall geometry, plate 9 is connected to the hangers strongly and in a manner effective to overcome the diaphragming problem.

As can be seen, either with or without beam 11, there is provided a unique suspension system, which can be formed into a unitary construction for easy installation either at the manufacturing facility or in the field.

The frame structures of this invention find unique applicability in the third axle lift system art wherein high strength is necessary for safety and certification purposes. These frame structures, furthermore, are particularly useful for mounting lift suspension systems which employ air bags and upwardly biased leaf springs as a lift mechanism.

A particular instance, in this respect, in which this invention finds especially high utility is in the trailer industry wherein, in many instances, the conventional longitudinally extending I-beam members of the trailer are widely spaced and so near the wheels as to prevent the air bags from being presented in spread configuration. Thus, the air bags must be inwardly displaced laterally from under the I-beams thus detracting from the strengthening features of the device. The subject invention provides a unique solution to this problem in the trailer industry.

Figure 5:
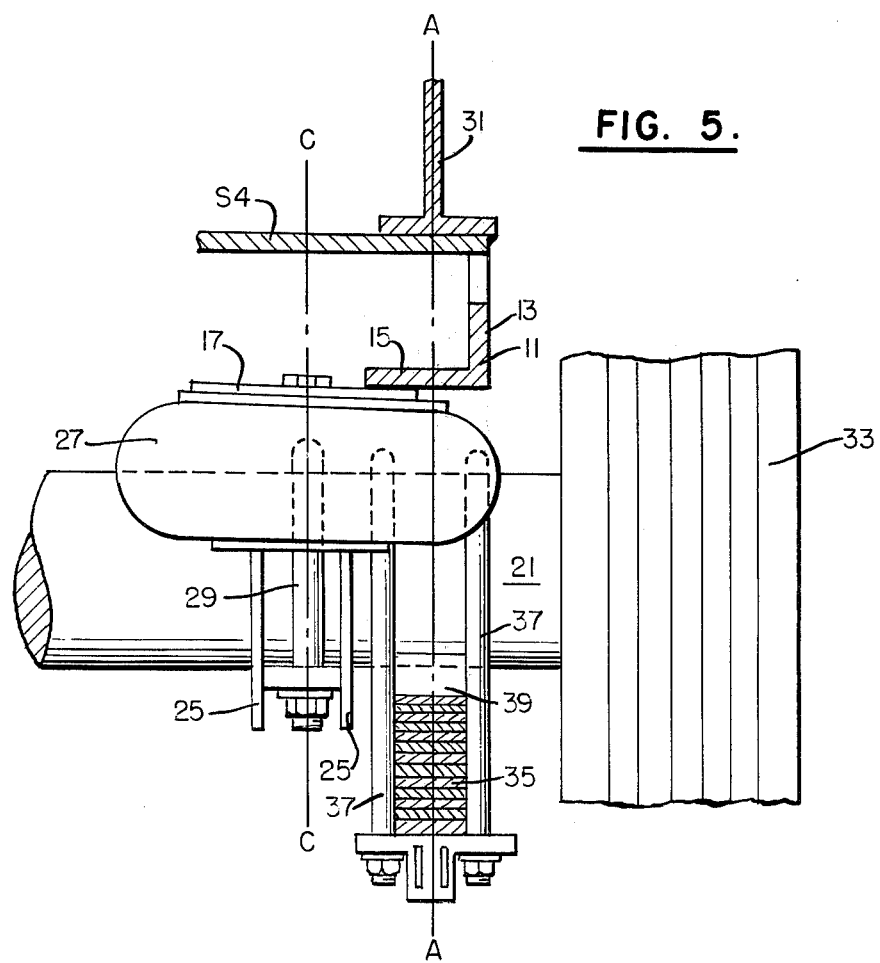
FIG. 5 is an end sectional, partially schematic view of the suspension of FIG. 4 illustrating the alignment laterally, of various members therein.

As illustrated in FIGS. 4–5, there is provided an axle 21 having mounted thereon bag arm mechanism 23 comprised of two plates 25 which extend upwardly so as to retain conventional air bags 27 between the axle and the vehicle. Air bags 27 may be of any conventional type herein shown as the rolling lobe type but may also be of the conventional convolution type. Bag arm mechanism 23 is connected to axle 21 by way of a U-bolt construction 29. As can be seen from the partially schematized drawing in FIG. 5, the center line "C" of air bags 29 is spaced a considerable distance inwardly and laterally from center line A of the I-beam frame member 31 of the vehicle. This is usually because, as occurs in many trailer models, wheels 33 are so close to I-beam 31 that the bags can not be safely spread any further.

As illustrated, despite the fact that air bags 27 are located laterally inwardly from the centerline of frame member 31, the unit is exceedingly strong. Bag plate 17 is connected to lower flange 15 and to section $S_6$ which members effectively transmit the airbag forces to the frame members 31.

In addition, the location of hanger brackets 1$a$ and $b$ provides for the leaf springs 35 and radius rod 43 to be located substantially under the center line of frame member 31 thus further strengthening the unit.

As illustrated in FIGS. 4 and 5, the system is provided with an upwardly biased half-elliptic leaf spring 35 connected to the axle by U-bolts 37 and having a saddle member 39 juxtapositioned between axle 21 and the upper plate of spring 37 so as to conform the upper surface of the spring to the lower surface of the axle. Located on the lower plate 41 to which U bolts 37 are connected is provided a radius rod 43 (not shown in FIG. 5 for convenience) which is pivotally connected at one end to the axle, via the aforementioned structures, at point 45 and is pivotally secured to the hanger brackets via pivotal connection 47 located in holes 7. Leaf springs 35 are allowed to slidingly reside at one end upon mounting means 49 located on the radius rod 43 and at the other end upon a small slider block 51 located in the bracket complimentary to that bracket containing raduis rod 43.

The frame structure and suspension is conveniently and yet strongly and reliably connected to frame members 31 via the upper surfaces of lateral walls 5 and longitudinal walls 3, and by way of the upper surface of section $S_4$. While any conventional mechanism for connecting the frame structure to frame member 31 may be employed, it has been found both safe, and economical to employ a welded connection at the various intersecting surfaces of member 31 with walls 3 and 5 and section $S_4$.

In operation, the upwardly biased, preloaded leaf springs 35 normally hold wheels 33 out of engagement with the road surface (i.e., when for example the vehicle is empty) and such a preload is effectively taken up since plate 17 is secured through flange beam $S_6$, section $S_5$ and section $S_4$ to the frame of the vehicle (as well as having it taken up by way of beam 11). When the air bags are expanded (in a conventional manner) they drive axle 21 downwardly until wheel 33 hits the road surface. Now that the wheel is in engagement with the road surface, those forces hereinabove described in regard to braking and other dynamic forces will be experienced during operation. By the provision of the unique structure including the hanger brackets, and plate means 9, there is provided a strong and reliable suspension system.

Once given the above disclosure many other features modifications and improvements will become apparent to the skilled artisan. Such other modifications, features and improvements are therefor considered to be a part of this invention, the scope of which is to be determined by the following claims.

I claim:

1. A frame structure for connecting an axle suspension system to a wheeled vehicle comprising
    at least two downwardly extending and opposing leaf spring hanger brackets, said brackets having a longitudinal side wall member and a lateral wall member connected thereto, and
    a plate means extending laterally between and weldably connected to the inner surfaces of the wall members of the opposing brackets, the plate means comprising a plurality of laterally extending sections including a lower section extending between and connected to the inner surfaces of the lateral wall members of opposing brackets, an upper section for connecting said structure to the lower surface of a frame member of the vehicle, and a section located intermediate said upper and lower sections, said intermediate section extending laterally between and connected to the inner surfaces of the longitudinal side wall member of the opposing brackets, and being at a finite angle other than 90° with respect to said upper and lower sections and being at a finite angle other than 0° with respect to the vertical when said frame structure is connected to said vehicle.

2. A frame structure according to claim 1 wherein said intermediate section is formed of two subsections disposed at a finite angle one with respect to the other, each subsection being at a finite angle other than 0° with respect to the vertical when said frame structure is connected to said vehicle.

3. A frame structure according to claim 1 wherein the upper surface of said upper section of the plate means lies in substantially the same plane as the upper surface of the opposing hanger brackets.

4. A frame structure according to claim 1 wherein the sections of said plate means are joined together, thereby forming a unitary plate, and wherein said plate means further includes an air bag securing section extending laterally of said structure.

5. A frame structure for connecting an axle suspension system to the frame members of a wheeled vehicle, the frame structure comprising opposing and complementary downwardly extending leaf spring hanger bracket means having a longitudinal side wall member and a laterally extending wall member connected thereto, opposing beams extending longitudinally between complimentary hanger brackets, and opposing plate means at substantially either end of the opposing beams extending laterally between said opposing beams and extending laterally between and being weldably connected to opposing brackets, the plate means comprising a plurality of laterally extending sections including a lower section extending between and weldingly connected to the inner surfaces of the laterally extending wall members of opposing brackets, an upper section for connecting said structure to the lower surface of a frame member of the vehicle, and a section located intermediate said upper and lower sections, said intermediate section extending laterally between and weldingly connected to the inner surfaces of the longitudinal side wall of the opposing brackets and being at a finite angle other than 90° with respect to said upper and lower sections and being at a finite angle other than 0° with respect to the vertical when said frame structure is connected to said vehicle.

6. A frame structure according to claim 5 wherein the upper surface of said upper section of the plate means lies in substantially the same plane as the upper surface of the opposing hanger brackets,
wherein the sections of said plate means are joined together, thereby forming a unitary plate, and
wherein said plate means further includes an airbag securing section extending laterally of said structure, each of said securing sections being capable of retaining two airbags in lateral side-by-side relation.

7. A frame structure according to claim 6 wherein said airbag securing sections of said plate means and said opposing beams are positioned so as to cooperate as air bag securing means.

8. A frame structure according to claim 7 wherein said airbag securing section is weldingly connected to opposing beams.

9. A frame structure according to claim 8 wherein said intermediate section is comprised of two subsections joined together at a finite angle one to the other, each of said subsections being at a finite angle other than 0° with respect to the vertical,
said air bag section includes a substantially vertical flange and a substantially horizontal flange,
said longitudinally extending beams include a substantially vertical wall member and substantially horizontal inwardly extending flange,
wherein the ends of said horizontal flange of said air bag section reside upon and are weldingly connected to the horizontal flange of opposing beams, and
wherein the ends of said beams contact the intermediate sections of said opposing plate means.

10. A frame structure according to claim 5 which includes four hanger brackets extending downwardly in substantially the vertical direction, each of said four hanger brackets being positioned at a corner of said frame structure so as to comprise a pair of complimentary and a pair of opposing brackets, and which further includes two of said plate means, wherein said lower section is substantially vertical and is weldingly connected to the lateral wall members of said brackets, wherein said upper section forms a substantially flat horizontal surface, and wherein said intermediate section is weldingly connected to the inner surfaces of the longitudinal side wall members of opposing hanger brackets.

11. In an axle suspension system for a wheeled vehicle having longitudinally extending frame members on either side of said vehicle, wherein said suspension system includes a frame structure for attaching said system to the frame members of the vehicle and wherein said suspension includes an axle mountable perpendicularly to the longitudinal direction of the frame members, a leaf spring mountable substantially directly under each outer frame member and when so mounted extending in the longitudinal direction thereof, the ends of said leaf springs being connected to their respective frame member by spring hanger brackets, said hanger brackets extending substantially vertically from beneath each frame member, means for connecting the axle to the springs at about the springs central portion, each spring being normally biased upwardly so that when the system is mounted on said wheeled vehicle, the wheels attached to the axle are normally held above the road surface, two vertically flexible air bag means for each leaf spring and means for locating the airbag means between the frame structure and the springs which means also offset the bags from the vertical plane of the axle, such that when the system is mounted and when air pressure is applied to the bags, they elongate, forcing the axle downwardly against the upward bias of the spring to engage the wheels of the vehicle with the road surface, the improvement comprising as said frame structure, the frame structure of claim 1.

12. In an axle suspension system for a wheeled vehicle having longitudinally extending frame members on either side of said vehicle, wherein said suspension system includes a frame structure for attaching said system to the frame members of the vehicle and wherein said suspension includes an axle mountable perpendicularly to the longitudinal direction of the frame members, a leaf spring mountable substantially directly under each outer frame member and when so mounted extending in the longitudinal direction thereof, the ends of said leaf springs being connected to their respective frame member by spring hanger brackets, said hanger brackets extending substantially vertically from beneath each frame member, means for connecting the axle to the springs at about the springs central portion, each spring being normally biased upwardly so that when the system is mounted on said wheeled vehicle, the wheels attached to the axle are normally held above the road surface, two vertically flexible air bag means for each leaf spring and means for locating the air bag means between the frame structure and the springs which means also offset the bags from the vertical plane of the axle, such that when the system is mounted and when air pressure is applied to the bags, they elongate, forcing the axle downwardly against the upward bias of the spring to engage the wheels of the vehicle with the road surface, and torque arm means connected between said axle and one pair of opposing hanger brackets, the improvement comprising as said frame structure, the frame structure of claim 6.

13. In an axle suspension system for a wheeled vehicle having longitudinally extending frame members on either side of said vehicle, wherein said suspension system includes a frame structure for attaching said system to the frame members of the vehicle and wherein said suspension includes an axle mountable perpendicularly to the longitudinal direction of the frame members, a leaf spring mountable substantially directly under each outer frame member and when so mounted extending in the longitudinal direction thereof, the ends of said leaf springs being connected to their respective frame member by spring hanger brackets, said hanger brackets extending substantially vertically from beneath each frame member, means for connecting the axle to the springs at about the springs central portion, each spring being normally biased upwardly so that when the system is mounted on said wheeled vehicle, the wheels attached to the axle are normally held above the road surface, two vertically flexible air bag means for each leaf spring and means for locating the airbag means between the frame structure and the springs which means also offset the bags from the vertical plane of the axle, such that when the system is mounted and when air pressure is applied to the bags, they elongate, forcing the axle downwardly against the upward bias of the spring to engage the wheels of the vehicle with the road surface, the improvement comprising as said frame structure, the frame structure of claim 9, wherein said frame structure is attached to the frame members of the vehicle at the upper surface of said hanger brackets and at upper surface of said upper section of said plate means.

\* \* \* \* \*